United States Patent
Mamtimin et al.

(10) Patent No.: US 11,378,715 B2
(45) Date of Patent: Jul. 5, 2022

(54) DENSITY MEASUREMENT OF A SELECTED LAYER BY GAMMA SPECTRAL DECONVOLUTION

(71) Applicant: Halliburton Energy Services, Inc., Houston, TX (US)

(72) Inventors: Mayir Mamtimin, Spring, TX (US); Jeffrey James Crawford, Katy, TX (US)

(73) Assignee: Halliburton Energy Services, Inc., Houston, TX (US)

(*) Notice: Subject to any disclaimer, the term of this patent is extended or adjusted under 35 U.S.C. 154(b) by 259 days.

(21) Appl. No.: 16/886,475

(22) Filed: May 28, 2020

(65) Prior Publication Data
US 2021/0373195 A1    Dec. 2, 2021

(51) Int. Cl.
*G01V 5/12*    (2006.01)
*G01V 5/10*    (2006.01)

(52) U.S. Cl.
CPC .............. *G01V 5/125* (2013.01); *G01V 5/101* (2013.01)

(58) Field of Classification Search
CPC ........... G01V 5/125; G01V 5/101; G01V 5/12
See application file for complete search history.

(56) References Cited

U.S. PATENT DOCUMENTS

| | | | | |
|---|---|---|---|---|
| 3,038,075 A * | 6/1962 | Youmans | ............... | G01V 5/125 250/266 |
| 4,587,423 A * | 5/1986 | Boyce | ..................... | E21B 43/04 250/262 |
| 4,864,129 A * | 9/1989 | Paske | ..................... | G01V 5/125 250/252.1 |
| 5,608,215 A * | 3/1997 | Evans | ..................... | G01V 5/107 250/269.2 |
| 7,292,942 B2 | 11/2007 | Ellis et al. | | |
| 9,322,949 B2 | 4/2016 | Mosse et al. | | |
| 2011/0253364 A1* | 10/2011 | Mosse | ..................... | G01V 5/125 175/50 |
| 2012/0303280 A1* | 11/2012 | Xu | ......................... | G01N 15/08 702/12 |

(Continued)

FOREIGN PATENT DOCUMENTS

CN    203161209    8/2013

OTHER PUBLICATIONS

U.S. Appl. No. 15/565,132, filed Oct. 6, 2017.

(Continued)

*Primary Examiner* — Marcus H Taningco
(74) *Attorney, Agent, or Firm* — John Wustenberg; C. Tumey Law Group PLLC

(57) ABSTRACT

A method and system for determining a density. The method may comprise disposing a nuclear density tool into a wellbore, performing a spectral deconvolution, determining an energy channel for a first measurement layer, recording a count rate with the gamma detector for the first measurement layer, applying a slope operator to the count rate, and identifying a first density of the first measurement layer. The system may comprise a nuclear density tool that includes a gamma source and a gamma detector configured to record a count rate, wherein the gamma detector and the gamma source are disposed on a longitudinal axis of the nuclear density tool. The system may also comprise an information handling system.

20 Claims, 5 Drawing Sheets

(56) References Cited

U.S. PATENT DOCUMENTS

| | | | |
|---|---|---|---|
| 2014/0042311 A1* | 2/2014 | Zhou | G01V 5/101 |
| | | | 250/269.8 |
| 2014/0052376 A1 | 2/2014 | Guo et al. | |
| 2017/0329041 A1 | 11/2017 | Zhang et al. | |
| 2018/0180763 A1 | 6/2018 | Zhang et al. | |
| 2018/0245451 A1 | 8/2018 | Hu et al. | |
| 2019/0242232 A1* | 8/2019 | Han | E21B 47/11 |
| 2019/0265384 A1 | 8/2019 | Jurczyk et al. | |
| 2020/0109626 A1 | 4/2020 | Hu et al. | |

OTHER PUBLICATIONS

"Density profile unfolding from Compton scattering measurements in reflection geometry" by J.E.F., M. B., A.G., and V. S., X-ray Spectrum. 2007; 36: 20-26.
"A new approach to determining compensated density and Pe values with a spectral density tool", by G.L. Moake 1991 SPWLA.
WPS SOLT, SDNT, TTCE.
SDS ALD.
International Search Report and Written Opinion for Application No. PCT/US2020/036430, dated Feb. 24, 2021.
M. Maučec; R.J. de Meijer; C. Rigollet; P.H.G.M. Hendriks; D.G. Jones (2004). Detection of radioactive particles offshore by γ-ray spectrometry Part I: Monte Carlo assessment of detection depth limits. , 525(3), 593-609.

* cited by examiner

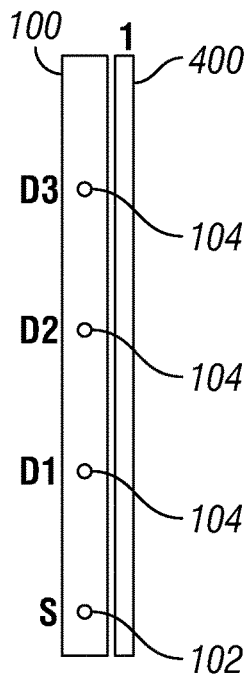 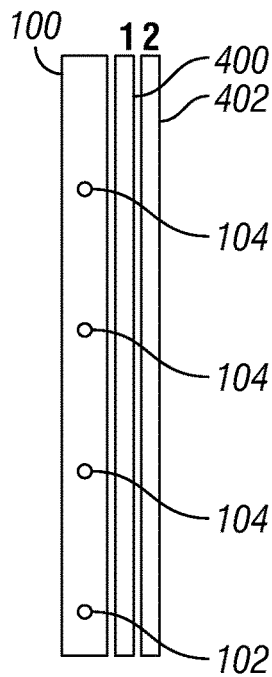 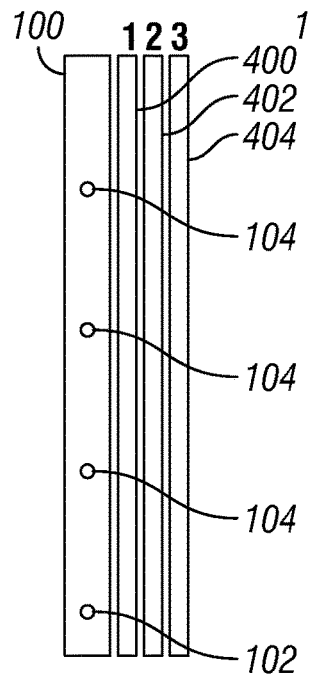 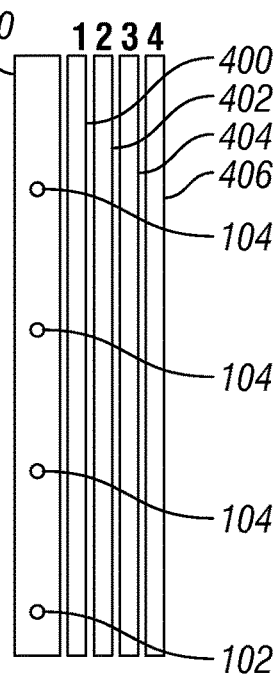
*FIG. 4A*    *FIG. 4B*    *FIG. 4C*    *FIG. 4D*
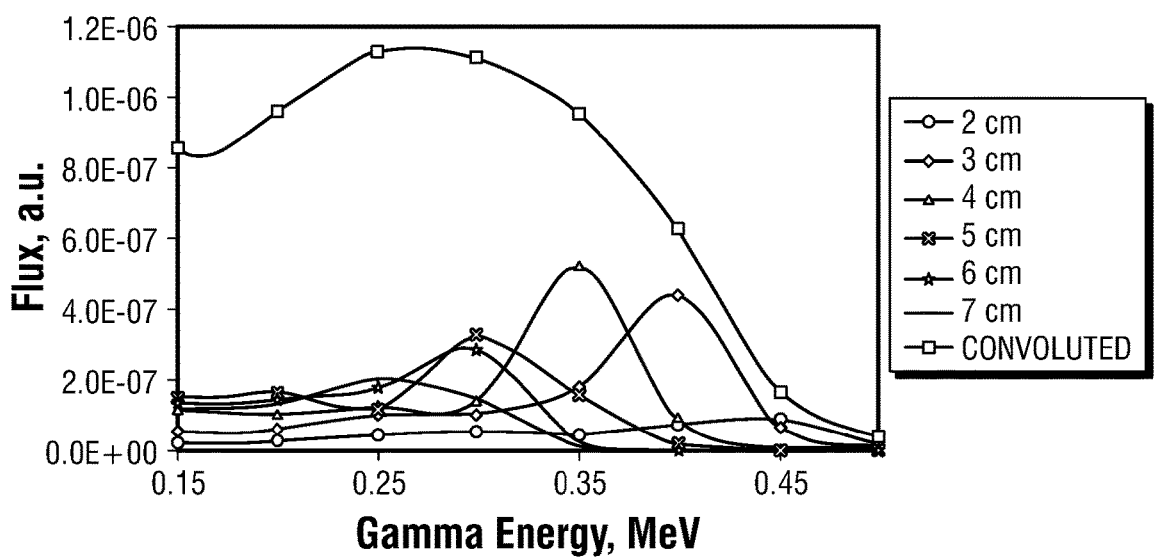
*FIG. 5*

DENSITY MEASUREMENT OF A SELECTED LAYER BY GAMMA SPECTRAL DECONVOLUTION

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

During the lifetime of the well the integrity of the cement, casing string, production tubing, and formation may be examined through one or more measurements. These measurements may be performed by a nuclear density tool. Existing nuclear density tools measure a bulk density of a single layer averaged over the depth of investigation, providing little information as to the variation in density as a function of radial distance from the sensor. Current density tools use the contrast between a near and far detector to apply a borehole correction to the density measured by the far detector. Usually the correction requires knowledge of the borehole environment, such as borehole size, standoff, and borehole fluid composition and density.

BRIEF DESCRIPTION OF THE DRAWINGS

These drawings illustrate certain aspects of some examples of the present disclosure and should not be used to limit or define the disclosure.

FIGS. 4A-4D illustrates an example method for isolating individual layers;

FIG. 5 is an example graph showing the differences in individual layers;

DETAILED DESCRIPTION

This disclosure may generally relate to systems and methods to measure the densities of individual annular layers within a depth of investigation using a nuclear density tool. This ability may be used in a cased-hole environment for cement evaluation since the individual cement layer(s) may be isolated. Additionally, methods and system may be used in an open-hole environment to determine formation density under normal conditions, in the presence of washouts or other conditions of large or non-uniform standoff, and when shallow invasion is present. Methods and system employ an optimized geometry to directly compute the densities of the various layers independently.

As discussed below, systems and methods disclosed may utilize a combination of radioactive gamma sources and multiple gamma detectors to measure densities of multiple annular layers. This nuclear density tool may include an optimized source-to-detector configuration to enhance the spectral sensitivities to multiple layers. Additionally, the method is developed by exploiting the unique geometrical characteristics and simple Compton scattering processes. In this method, it is assumed that all three layers and detector count rates are inter-related so that a feedback mechanism is built in to extract and refine each layer densities.

Figure 1:
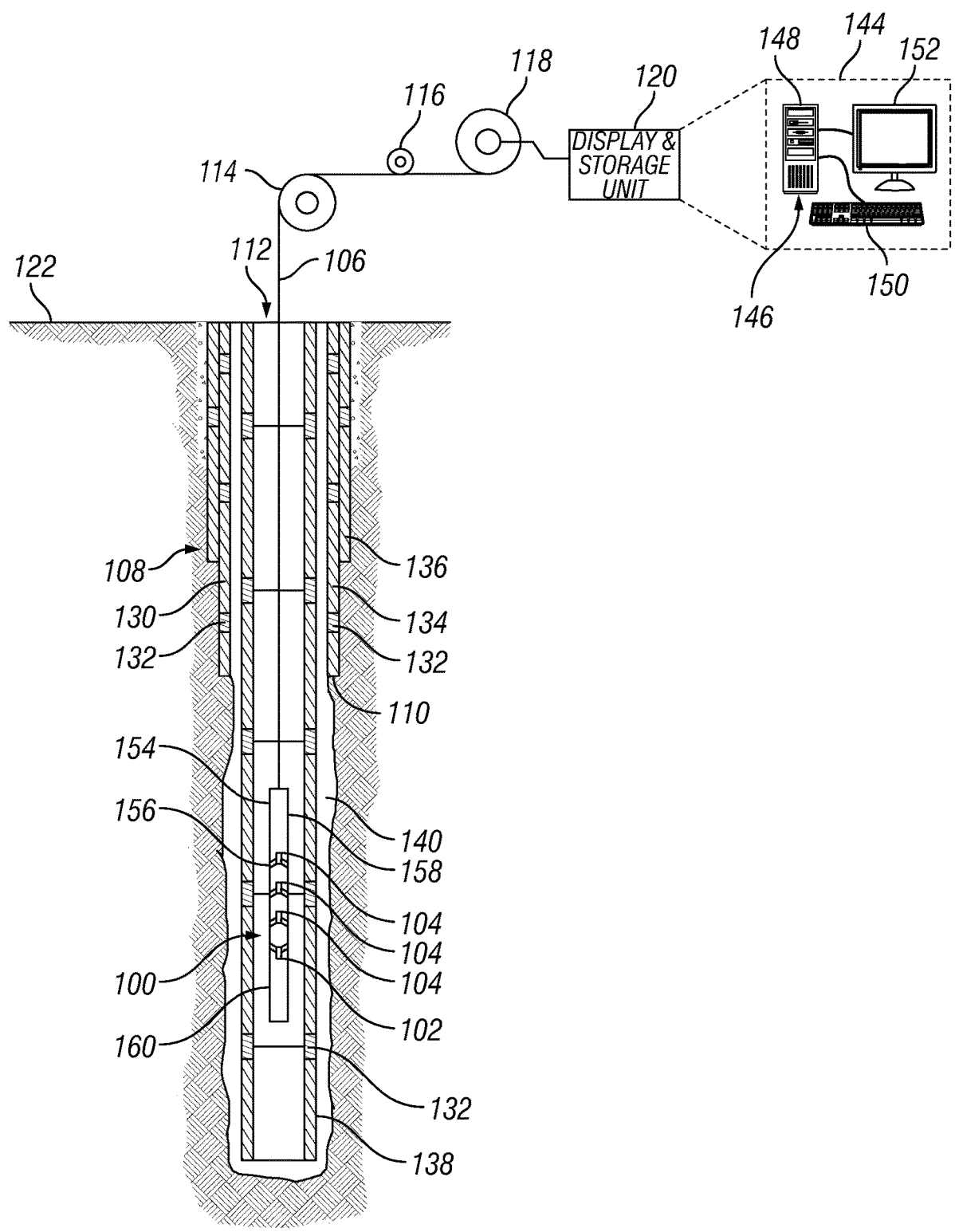
FIG. 1 illustrates an example of a nuclear density tool.

FIG. 1 illustrates an example operating environment for a nuclear density tool 100 as disclosed herein. Nuclear density tool 100 may comprise a gamma source 102 and/or a gamma detector 104. In examples, there may be any number of gamma sources 102 and/or any number of gamma detectors 104, which may be disposed on nuclear density tool 100. Nuclear density tool 100 may be operatively coupled to a conveyance 106 (e.g., wireline, slickline, coiled tubing, pipe, downhole tractor, and/or the like) which may provide mechanical suspension, as well as electrical connectivity, for nuclear density tool 100. Conveyance 106 and nuclear density tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in wellbore 110. Signals recorded by nuclear density tool 100 may be stored on memory and then processed by display and storage unit 120 after recovery of nuclear density tool 100 from wellbore 110. Alternatively, signals recorded by nuclear density tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to nuclear density tool 100. Typical casing string 108 may extend from wellhead 112 at or above ground level to a selected depth within wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. Nuclear density tool 100 may be dimensioned so that it may be lowered into the wellbore 110 through pipe string 138, thus avoiding the difficulty and expense associated with pulling pipe string 138 out of wellbore 110. In examples, cement 140 may be disposed on the outside of pipe string 138. Cement 140 may further be disposed between pipe string 138 and casing string 108. It should be noted that cement 140 may be disposed between any number of casings, for example between first casing 134 and second casing 136 (not illustrated).

In logging systems, such as, for example, logging systems utilizing the nuclear density tool 100, a digital telemetry system may be employed, wherein an electrical circuit may be used to both supply power to nuclear density tool 100 and to transfer data between display and storage unit 120 and nuclear density tool 100. A DC voltage may be provided to nuclear density tool 100 by a power supply located above ground level, and data may be coupled to the DC power conductor by a baseband current pulse system. Alternatively, nuclear density tool 100 may be powered by batteries located within the downhole tool assembly, and/or the data provided by nuclear density tool 100 may be stored within the downhole tool assembly, rather than transmitted to the surface during logging.

During logging operations, the operation and function of gamma source 102 and gamma detector 104 may be controlled by display and storage unit 120, which may include an information handling system 144. As illustrated, information handling system 144 may be a component of the display and storage unit 120. Alternatively, information handling system 144 may be a component of acoustic logging tool 100. Information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with nuclear density tool 100 and/or software executed by processing unit 146. For example, information handling system 144 may enable an operator to select analysis options, view collected log data, view analysis results, and/or perform other tasks. In examples, nuclear density tool 100 and information handling system 144 may be utilized to measure material density in a downhole environment that may surround nuclear density tool 100.

As further illustrated in FIG. 1, nuclear density tool 100 may include a housing 154 which may protect gamma source 102, gamma detector 104, and/or other devices disposed within logging tool 100. Housing 154 may include a material that may prevent the transmission of energy from gamma source 102 or receiving reflected energy by gamma detector 104. In examples, housing 154 may include cut out 156, which may be identified as holes or grooves. Cut outs 156 may be angled and may allow for transmission of energy from gamma source 102 and the sensing/receiving of reflected energy by gamma detector 104. Additionally, gamma source 102 and gamma detector 104 may be disposed in different sub housing or both may be disposed in the same sub housing. For example, gamma source 102 may be disposed in a first sub housing 158 and gamma detector 104 may be disposed in a second sub housing 160. It should be noted that all sub housing may be disposed within housing 154.

As illustrated, one or more gamma detectors 104 may be positioned on nuclear density tool 100 at selected distances (e.g., axial spacing) away from gamma source 102. The axial spacing of gamma detector 104 from gamma source 102 may vary, for example, from about 0 inches (0 cm) to about 40 inches (102 cm) or more. In some embodiments, at least one gamma detector 104 may be placed near the gamma source 102 (e.g., within at least 1 inch (2.5 cm) while one or more additional gamma detectors may be spaced from 1 foot (31 cm) to about 5 feet (152 cm) or more from the gamma source 102. It should be understood that the configuration of nuclear density tool 100 shown on FIG. 1 is merely illustrative and other configurations of nuclear density tool 100 may be used with the present techniques. In addition, nuclear density tool 100 may include more than one gamma source 102 and more than one gamma detector 104. For example, an array of gamma detectors 104 may be used. The gamma sources 102 may include any suitable acoustic source and/or transducer for generating acoustic waves downhole, including, but not limited to, monopole and multipole sources (e.g., dipole, cross-dipole, quadrupole, hexapole, or higher order multi-pole gamma sources). Specific examples of suitable gamma sources 102 may include, but are not limited to, piezoelectric elements, bender bars, or other transducers suitable for generating acoustic waves downhole. Gamma detector 104 may include any suitable acoustic gamma detector suitable for use downhole, including piezoelectric elements that can convert acoustic waves into an electric signal.

Figure 2:
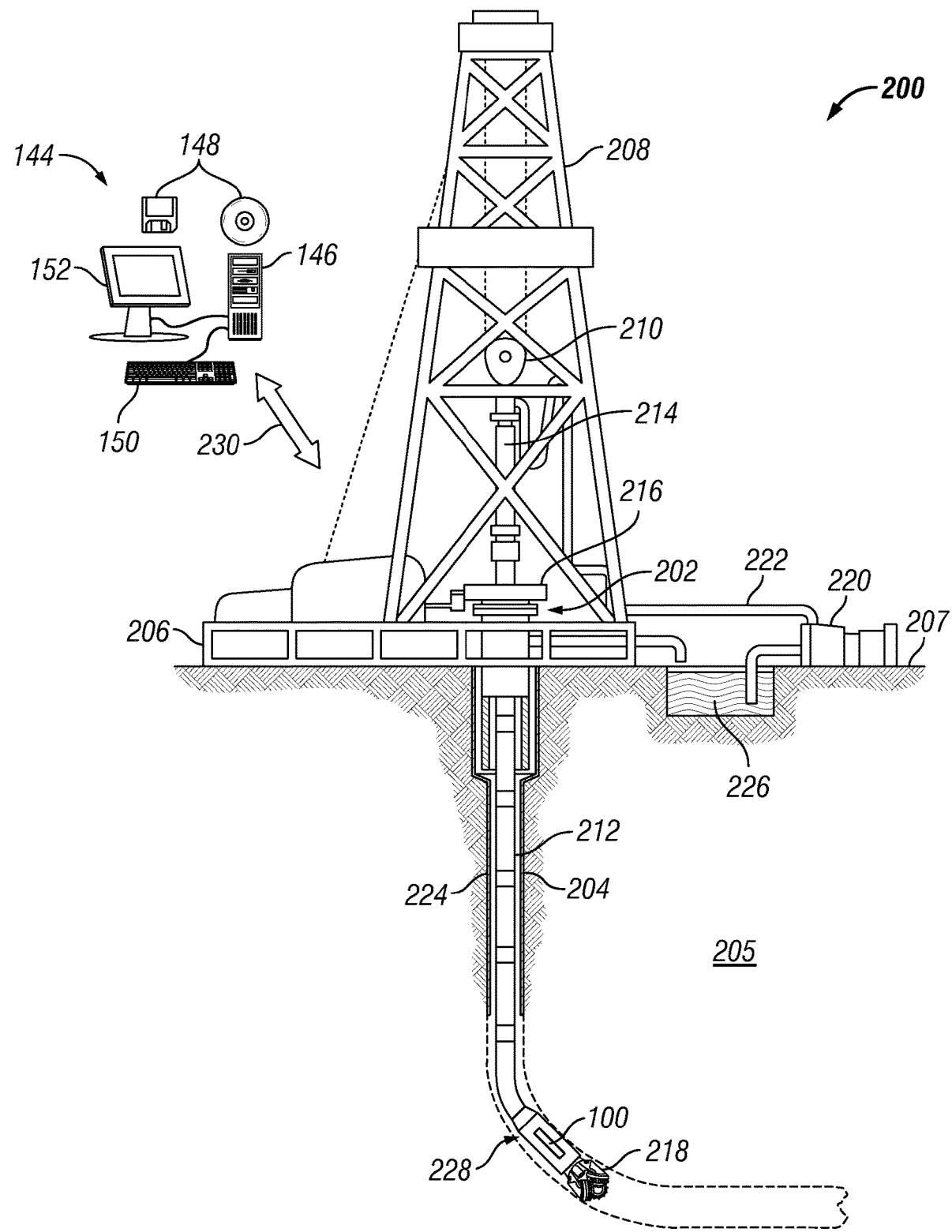
FIG. 2 illustrates another example of the nuclear density tool in a drill operation.

FIG. 2 illustrates an example in which nuclear density tool 100 may be disposed in a drilling system 200. As illustrated, borehole 204 may extend from a wellhead 202 into formation 205 from surface 207. Generally, borehole 204 may include horizontal, vertical, slanted, curved, and other types of borehole geometries and orientations. Imaging tools may be used in uncased sections of the borehole. Measurements may be made by imaging tools in cased sections for purposes such as calibration.

As illustrated, borehole 204 may extend through formation 205. As illustrated in FIG. 2, borehole 204 may extend generally vertically into the formation 205, however borehole 204 may extend at an angle through formation 205, such as horizontal and slanted boreholes. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 207. Without limitation, drill bit 218 may include, roller cone bits, PDC bits, natural diamond bits, any hole openers, reamers, coring bits, and the like. As drill bit 218 rotates, it may create and extend borehole 204 that penetrates various formations 205. A pump 220 may circulate drilling fluid through a feed pipe 222 to kelly 214, downhole through interior of drill string 212, through orifices in drill bit 218, back to surface 207 via annulus 224 surrounding drill string 212, and into a retention pit 226.

With continued reference to FIG. 2, drill string 212 may begin at wellhead 202 and may traverse borehole 204. Drill bit 218 may be attached to a distal end of drill string 212 and may be driven, for example, either by a downhole motor and/or via rotation of drill string 212 from surface 207 (Referring to FIG. 1). Drill bit 218 may be a part of bottom hole assembly 228 at distal end of drill string 212. Bottom hole assembly 228 may further comprise nuclear density tool 100 (Referring to FIG. 1). Nuclear density tool 100 may be disposed on the outside and/or within bottom hole assembly 228. As will be appreciated by those of ordinary skill in the art, bottom hole assembly 228 may be a measurement-while drilling (MWD) or logging-while-drilling (LWD) system.

Without limitation, bottom hole assembly 228 may be connected to and/or controlled by information handling system 144, which may be disposed on surface 207. Without limitation, information handling system 144 may be disposed down hole in bottom hole assembly 228. Processing of information recorded may occur down hole and/or on surface 207. Processing occurring downhole may be transmitted to surface 207 to be recorded, observed, and/or further analyzed. Additionally, information recorded on information handling system 144 that may be disposed down hole may be stored until bottom hole assembly 228 may be brought to surface 207. In examples, information handling system 144 may communicate with bottom hole assembly 228 through a fiber optic cable (not illustrated) disposed in (or on) drill string 212. In examples, wireless communication may be used to transmit information back and forth between information handling system 144 and bottom hole assembly 228. Information handling system 144 may transmit information to bottom hole assembly 228 and may receive as well as process information recorded by bottom hole assembly 228. In examples, a downhole information handling system (not illustrated) may include, without limitation, a microprocessor or other suitable circuitry, for estimating, receiving, and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 207. Alternatively, raw measurements from bottom hole assembly 228 may be transmitted to surface 207.

Any suitable technique may be used for transmitting signals from bottom hole assembly 228 to surface 207, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 207. Without limitation, an electromagnetic source in the telemetry subassembly may be operable to generate pressure pulses in the drilling fluid that propagate along the fluid stream to surface 207. At surface 207, pressure transducers (not shown) may convert the pressure signal into electrical signals for a digitizer (not illustrated). The digitizer may supply a digital form of the telemetry signals to information handling system 144 via a communication link 230, which may be a wired or wireless link. The telemetry data may be analyzed and processed by information handling system 144.

As illustrated, communication link 230 (which may be wired or wireless, for example) may be provided that may transmit data from bottom hole assembly 228 to an information handling system 144 at surface 207. Information handling system 144 may include a processing unit 146, an output device 152 such as a video display, an input device 150 (e.g., keyboard, mouse, etc.), and/or non-transitory computer-readable media 148 (e.g., optical disks, magnetic disks) that may store code representative of the methods described herein. In addition to, or in place of processing at surface 207, processing may occur downhole.

Figure 3:
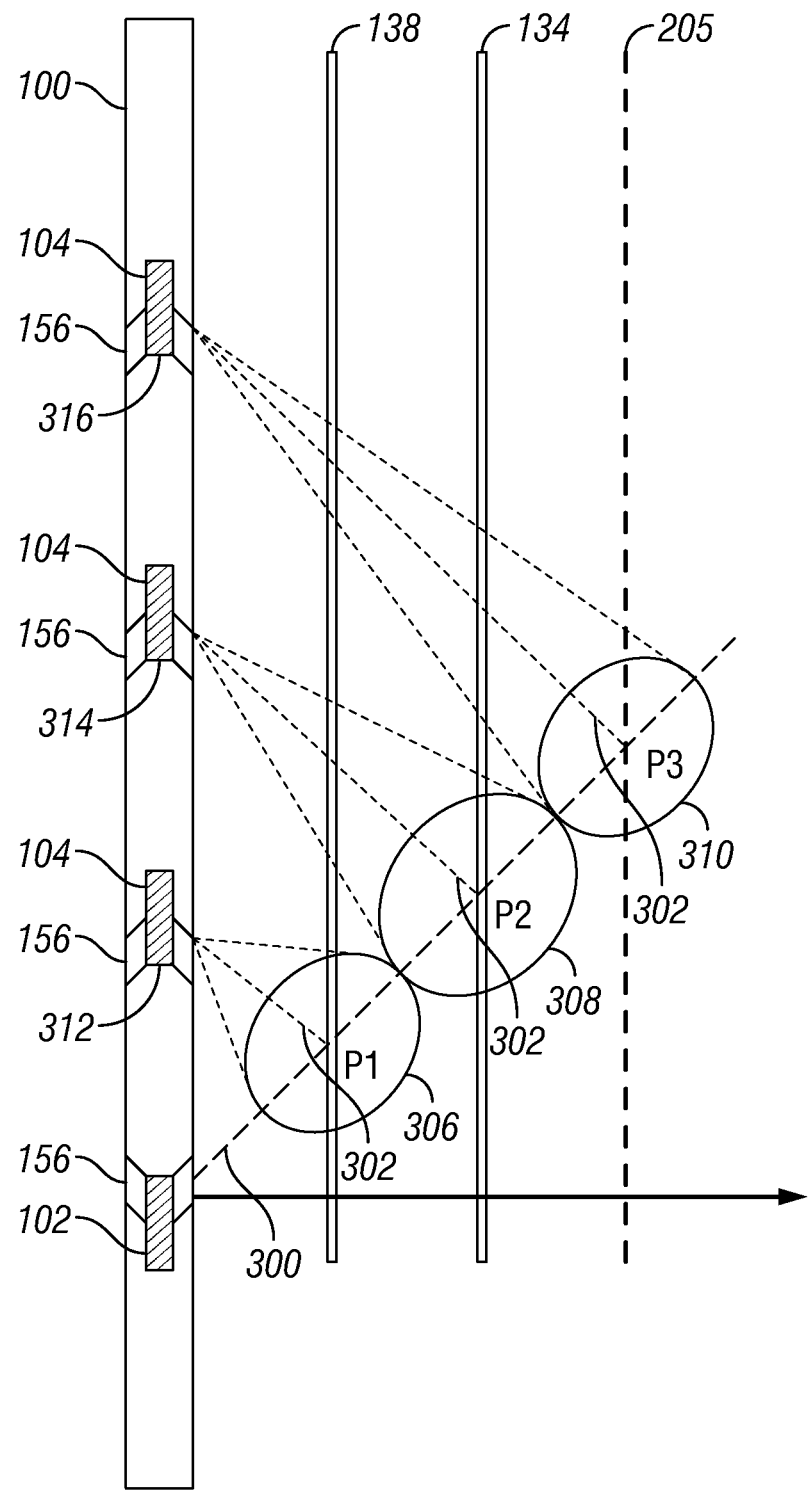
FIG. 3 illustrates an example measurement operation using the nuclear density tool.

FIG. 3 illustrates an example schematic of nuclear density tool 100 taking measurements. As illustrated, nuclear density tool 100 may measure the bulk electron density of the surrounding material based on a number of deflected gammas, deflected gammas being energy 300, detected by one or more gamma detectors 104 from a gamma source 102, in examples gamma source may be any radioactive source. Due to the inherent constrains of borehole environment, gamma source 102 and one or more gamma detectors 104 maybe be disposed on the same longitudinal axis through nuclear density tool 100. The amount of gamma attenuation and deflection is directly proportional to the compactness of electrons in the surrounding material. The penetration depth of the gamma rays determines the sampling range of nuclear density tool 100. In contrast, existing nuclear density tools offer a mature and robust technology to measure material density in downhole environment. Additionally, existing nuclear density tools and calculation algorithms are designed to extract only a bulk density of the surrounding material averaging over the sampling range/thickness, therefore, lacking the ability to resolve any intrinsic differences in individual annular layers within that volume.

Nuclear density tool 100 in FIG. 3 may be manufactured with a source-to-detector configuration to enhance the spectral sensitivities to multiple layers. Utilizing a multiple Compton scattering scheme of high-energy photons, cut outs 156 may be utilized to focus the primary Compton scattering angles at any suitable angle. Isolated behavior of a high-energy photon in matter is described with Compton scattering, photoelectric absorption, and pair production. Current nuclear density tool may use high energy gamma source (between 661 keV and 1332 keV) and rely on detection of quantity and intensity of the returning gamma. In this method, only the Compton scattering and photoelectric absorption are dominant interaction mechanisms that may be considered. In contrast, nuclear density tool 100 illustrated in FIG. 3 may utilize the photelectric effect. The photoelectric effect only yields density and elemental information within the very near vicinity of nuclear density tool 100. Thus, the photoelectric effect may only be applicable for layer density measurements closest to nuclear density tool 100.

With continued reference to FIG. 3, measurement operations may utilize a single Compton scattering approximation to determine initial source-to-detector distances. For example, gamma source 102 and one or more gamma detectors 104 collimation minimizes the complex behavior of gamma attenuation via multiple scattering. As illustrated, one or more cut outs 156 allow for gamma source 102 and each gamma detector 104 to "see" in at a specific angle and direction. During measurement operations, gamma source 102 may emit energy 300 out of nuclear density tool 100 through a cut out 156. Likewise, gamma detectors 104 may sense and/or detect reflected energy 302 at specific angles and directions from cut out 156. This may allow for a designated area to be measured by a specific gamma detector 104. For example, as illustrated in FIG. 3, designated areas may be divided into a first layer 306, a second layer 308, and a third layer 310. Each layer may be sensed specifically by a single specific gamma detector 104.

In examples, nuclear density tool 100 may measure the bulk electron density of the surrounding material based on the number of deflected gammas from gamma source 102. Due to the inherent constrains of borehole environment, gamma source 102 and gamma detectors 104 may be located on the same axis, as illustrated in FIG. 3. The amount of gamma attenuation and deflection is directly proportional to the compactness of electrons in the surrounding material. The penetration depth of the gamma rays determines the sampling range of nuclear density tool 100.

During measurement operations, when a selected layer, for example, first layer 306, a second layer 308, and a third layer 310 is under investigation, gamma source 102 and gamma detectors 104 may be configured to extract any change in that layer. This is due to the fact that each layer gives a unique contribution to the measured spectrum in different detectors. Therefore, it is possible to isolate each signal that corresponds to the layer of interest.

FIGS. 4A-4D illustrates an example method for isolating individual layers. As illustrates, the method may take measurements and add a measurement layer individually. For example, as illustrated, FIG. 4A adds a first measurement layer 400, FIG. 4B adds a second measurement layer 402, FIG. 4C adds a third measurement layer 404, and FIG. 4D adds a fourth measurement layer 406. Conceptually, one layer at a time is added (or removed) to unfold the contribution of that layer to the overall gamma spectrum. Eventually, outwards-slicing, adding layers, and inwards-slicing, removing layers, were taken to estimate the spectral contribution from each layer. FIG. 5 is an example graph showing the differences in individual layer (depth from 2 cm to 7 cm) contributions from six layers to the total convoluted spectrum. For example, energy channel of 0.35 MeV may be used to investigate the layer density at depth of 4 cm.

Figure 6:
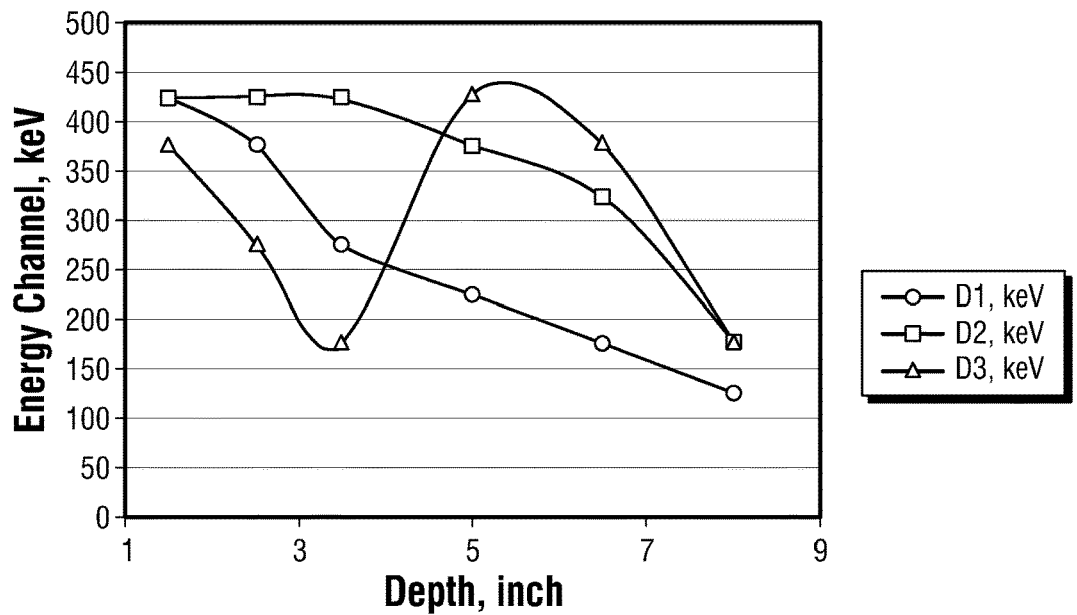
FIG. 6 is an example graph showing the combination of energy channels from different gamma detectors.

Additionally, as illustrated in the example graph of FIG. 6, other gamma detectors 104 may be used as a combination of energy channels from different gamma detectors 104 to investigate a layer at a selected depth. This information may be used when designing nuclear density tool 100. The slope of the spectrum, illustrated in FIG. 6, offers a way of correcting for extreme densities that may be adjacent to the layer/depth of interest. This is due to a relative change in adjacent layers, which is a change in the slope of the spectra. In this example, there are slightly higher counts in lower energy than that of higher energy in the blue spectra. Specifically, 250 keV is considered as the cutoff energy. Thus, energy less than 250 keV is lower energy and energy at 150 keV or higher is considered high energy. This may be caused by an increasing density in layers that include higher angle Compton scattering that results in lower gamma energy. The further away the layers are away from nuclear density tool 100, the higher angle from Compton scattering.

Figure 7:
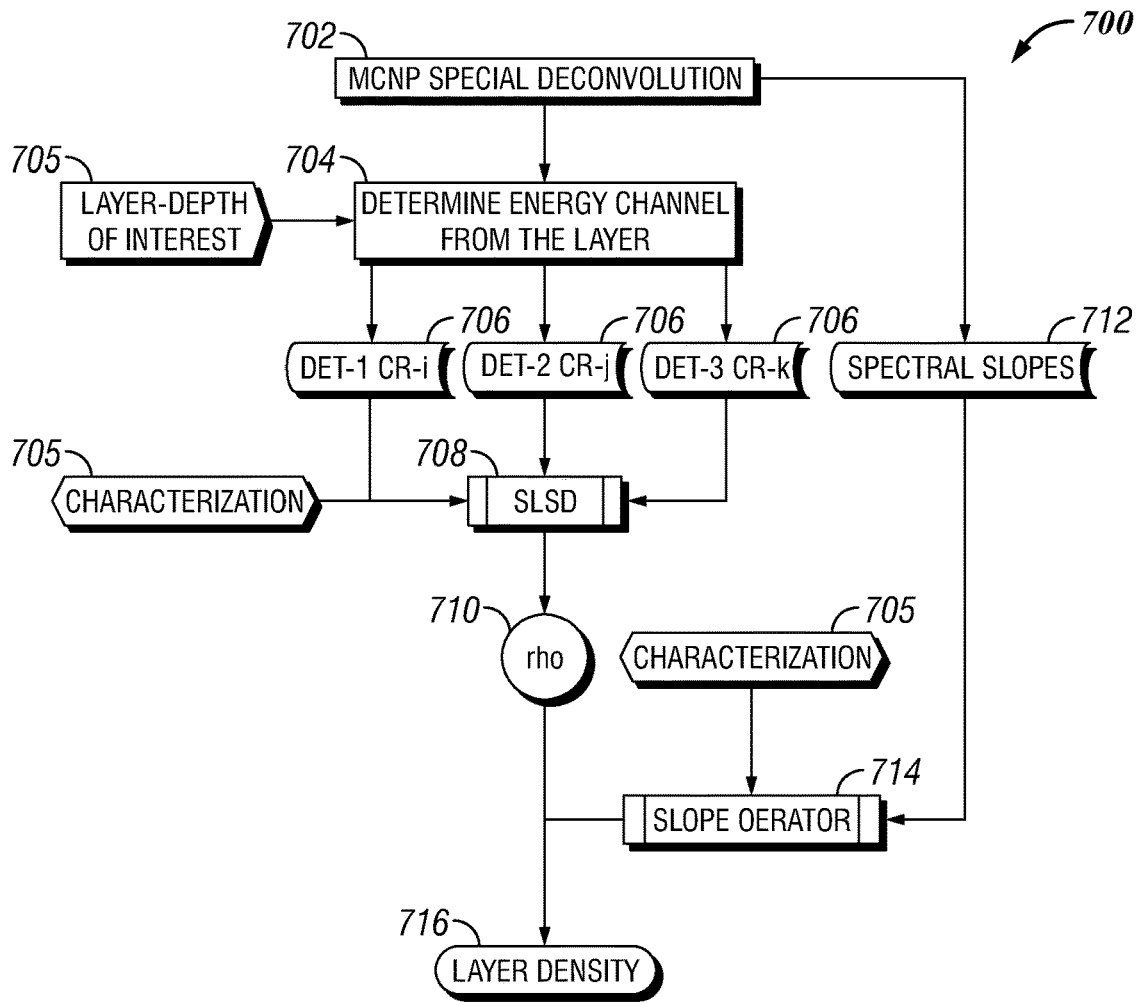
FIG. 7 is an example workflow for determining a density of a measured layer.

FIG. 7 illustrates an example workflow 700 for determining a density of a measured layer. Workflow 700 may begin with block 702, in which a matrix from Monte Carlo N-Particle (MCNP) spectral deconvolution is performed. Specifically, MCNP may be used for neutron, photon, electron, or coupled neutron, photon, or electron transport. Specific areas of application include, but are not limited to, radiation protection and dosimetry, radiation shielding, radiography, medical physics, nuclear criticality safety, detector design and analysis, nuclear oil well logging, accelerator target design, fission and fusion reactor design, decontamination, and/or decommissioning. The code treats an arbitrary three-dimensional configuration of materials in geometric cells bounded by first- and second-degree surfaces and fourth-degree elliptical tori. Spectral deconvolution may isolate the spectral component that is unique to a selected layer of interest, as discussed in FIG. 3. From block 702, in block 704 the energy channel for the layer is determined. The energy channel for a designated layer may be found using FIG. 6, as discussed above. Depending on the depth of interest (DOI), from block 705, from the X-axis of FIG. 6, the energy channel associated with the DOI may be used. Additionally, DOI is the maximum penetration depth of gamma particles from gamma source 102. DOI is defined as the distance where the intensity from gamma source 102 drops to 5% of initial source intensity by total attenuation. Thus, DOI increases when source gamma energy increase. Additionally, DOI is an inverse function of bulk electron density. For example, when the average density of borehole is 2 g/cc, DOI is about 7 inches (18 centimeters). DOI determines how far gamma detectors 104 (e.g., referring to FIG. 1) may "see" or sense. Characterization may be performed by MCNP computer simulations where the exact geometries of nuclear density tool 100 and borehole 204 are modeled with detailed physics to determine the A coefficients. Additionally, the energy channel for the layer may be characterized from block 704. Characterization may be performed by lab experiments where nuclear density tool 100 is disposed in well-known borehole fixtures to calibrate responses from nuclear density tool 100.

In blocks 706, count rate for each gamma detector 104 (e.g., referring to FIG. 4) is determined. These count rates are obtained from each gamma detector 104. In block 708, each count rate is used in a selected layer spectral deconvolution (SLSD) function is used with input count rates to calculate a density in block 710 the p for the layer is found. Specific Layer Spectral Deconvolution functions by using the count rates from one or more gamma detectors 104 (or n detector count rates) then computes a single layer density from the count rates. Additionally, the SLSD may be characterized from block 705, as discussed above.

In block 712, spectral slopes are found from the spectral deconvolution in block 702, as they are the slope of the detector spectrum found in FIG. 5. In block 714, the slope operator is determined. The slope operator takes a computed spectral slope and computes layer density. For examples, a spectral slope operator is applied to correct and adjust layer density based on the adjacent layers. For example, information about adjacent layers may be represented in the spectral slope as seen in FIG. 5. Thus, a correction may be made to the layer density calculation. This is to have inherent correction mechanism to account for extreme cases where adjacent densities are too low or too high. Too low is defined as 0 g/cc (basically air) and too high is defined as 10 g/cc (very dense material such as metallic layer). Additionally, the slope operator in block 714 may be characterized from block 705 as discussed above. In block 716, the slope operator from block 716 and the p from block 710 are used in block 716 to determine layer density. For example, density of cement, pipe, or formation may be determined. Generally, block 710 is the layer density for block 716. Only in extreme cases described above, does block 710 needs to be corrected if the layer of interest lies right next to a very low or high density layer. In such cases, spectral slope from block 714 may be conditioned to detect any extreme cases for correction.

Workflow 700 may be used with existing tools to optimize their response. For example, any tool design with two or more gamma detectors 104 (e.g., referring to FIG. 3). If there are N detectors, it is possible to combine unique energy channels from N detectors to extract the density of one specific layer. Additionally, this method may be applied in cased-hole or open-hole environments.

Existing nuclear density tools measure a bulk density of a single layer averaged over the depth of investigation, providing little information as to the variation in density as a function of radial distance from the sensor. In some applications, only a selected layer at a certain depth is of interest such that it is necessary to extract only the information from that specific layer instead of a bulk signal of all the surrounding materials. The methods and systems disclosed introduces a novel approach to measure the density of a selected individual annular layer by combining an optimized multi-detector, single-source design, and a gamma spectral deconvolution method. The systems and methods may include any of the various features of the systems and methods disclosed herein, including one or more of the following statements.

Statement 1. A method for determining a density may comprise disposing a nuclear density tool into a wellbore. The nuclear density tool may comprise a gamma source and a gamma detector. The gamma detector and the gamma source are disposed on a longitudinal axis of the nuclear density tool. The method may further include performing a spectral deconvolution, determining an energy channel for a first measurement layer, recording a count rate with the gamma detector for the first measurement layer, applying a slope operator to the count rate, and identifying a first density of the first measurement layer.

Statement 2. The method of statement 1, further comprising determining the energy channel for a second measurement layer.

Statement 3. The method of statement 2, further comprising recording a second count rate with the gamma detector for the second measurement layer.

Statement 4. The method of statement 3, further comprising applying a second slope operator to the second count rate.

Statement 5. The method of statement 4, further comprising identifying a second density of the second measurement layer.

Statement 6. The method of statements 1 or 2, wherein the energy channel for the first measurement layer is characterized.

Statement 7. The method of statements 1, 2, or 6, wherein the spectral deconvolution is a Monte Carlo N-Particle function.

Statement 8. The method of statements 1, 2, 6, or 7, further comprising performing a selected layer spectral deconvolution is performed on the first density.

Statement 9. The method of statement 8, further comprising characterizing the selected layer spectral deconvolution.

Statement 10. The method of statement 9, further comprising correcting the selected layer spectral deconvolution.

Statement 11. A system for determining a density may comprise a nuclear density tool. The nuclear density tool may include a gamma source and a gamma detector configured to record a count rate. The gamma detector and the gamma source are disposed on a longitudinal axis of the nuclear density tool. The system may further include an information handling system configured to perform a spectral deconvolution, determine an energy channel for a first measurement layer, apply a slope operator to the count rate, and identify a first density of the first measurement layer.

Statement 12. The system of statement 11, wherein the information handling system is further configured to determine the energy channel for a second measurement layer.

Statement 13. The system of statement 12, wherein the gamma detector is configured to measure a second count rate for the second measurement layer.

Statement 14. The system of statement 13, wherein the information handling system is further configured to apply a second slope operator to the second count rate.

Statement 15. The system of statement 14, wherein the information handling system is further configured to identify a second density of the second measurement layer.

Statement 16. The system of statements 11 or 12, wherein the energy channel for the first measurement layer is characterized.

Statement 17. The system of statements 11, 12, or 16, wherein the spectral deconvolution is a Monte Carlo N-Particle function.

Statement 18. The system of statements 11, 12, 16, or 17 wherein the information handling system is further configured to perform a selected layer spectral deconvolution is performed on the first density.

Statement 19. The system of statement 18, wherein the information handling system is further configured to characterize the selected layer spectral deconvolution.

Statement 20. The system of statement 19, wherein the information handling system is further configured to correct the selected layer spectral deconvolution.

Although the present disclosure and its advantages have been described in detail, it should be understood that various changes, substitutions, and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for determining a density comprising:
   disposing a nuclear density tool into a wellbore, wherein the nuclear density tool comprises:
      a gamma source; and
      a gamma detector, wherein the gamma detector and the gamma source are disposed on a longitudinal axis of the nuclear density tool;
   performing a spectral deconvolution;
   determining an energy channel for a first measurement layer;
   recording a count rate with the gamma detector for the first measurement layer;
   applying a slope operator to the count rate; and
   identifying a first density of the first measurement layer.

2. The method of claim 1, further comprising determining the energy channel for a second measurement layer.

3. The method of claim 2, further comprising recording a second count rate with the gamma detector for the second measurement layer.

4. The method of claim 3, further comprising applying a second slope operator to the second count rate.

5. The method of claim 4, further comprising identifying a second density of the second measurement layer.

6. The method of claim 1, wherein the energy channel for the first measurement layer is characterized.

7. The method of claim 1, wherein the spectral deconvolution is a Monte Carlo N-Particle function.

8. The method of claim 1, further comprising performing a selected layer spectral deconvolution is performed on the first density.

9. The method of claim 8, further comprising characterizing the selected layer spectral deconvolution.

10. The method of claim 9, further comprising correcting the selected layer spectral deconvolution.

11. A system for determining a density comprising:
    a nuclear density tool, wherein the nuclear density tool comprises:
       a gamma source; and
       a gamma detector configured to record a count rate, wherein the gamma detector and the gamma source are disposed on a longitudinal axis of the nuclear density tool; and
    an information handling system configured to:
       perform a spectral deconvolution;
       determine an energy channel for a first measurement layer;
       apply a slope operator to the count rate; and
       identify a first density of the first measurement layer.

12. The system of claim 11, wherein the information handling system is further configured to determine the energy channel for a second measurement layer.

13. The system of claim 12, wherein the gamma detector is configured to measure a second count rate for the second measurement layer.

14. The system of claim 13, wherein the information handling system is further configured to apply a second slope operator to the second count rate.

15. The system of claim 14, wherein the information handling system is further configured to identify a second density of the second measurement layer.

16. The system of claim 11, wherein the energy channel for the first measurement layer is characterized.

17. The system of claim 11, wherein the spectral deconvolution is a Monte Carlo N-Particle function.

18. The system of claim 11, wherein the information handling system is further configured to perform a selected layer spectral deconvolution is performed on the first density.

19. The system of claim 18, wherein the information handling system is further configured to characterize the selected layer spectral deconvolution.

20. The system of claim 19, wherein the information handling system is further configured to correct the selected layer spectral deconvolution.

* * * * *